United States Patent
Almasan et al.

(10) Patent No.: US 11,755,289 B1
(45) Date of Patent: Sep. 12, 2023

(54) AUTOMATED USE CASE EVALUATION, ONBOARDING AND GAMIFICATION

(71) Applicant: MCKINSEY & COMPANY, INC., New York, NY (US)

(72) Inventors: Rares Almasan, Paradise Valley, AZ (US); Serjesh Sharma, Atlanta, GA (US); Annemary Jose, Atlanta, GA (US); Sastry Vsm Durvasula, Phoenix, AZ (US)

(73) Assignee: MCKINSEY & COMPANY, INC., New York, NY (US)

(*) Notice: Subject to any disclaimer, the term of this patent is extended or adjusted under 35 U.S.C. 154(b) by 0 days.

(21) Appl. No.: 18/113,548

(22) Filed: Feb. 23, 2023

(51) Int. Cl.
*G06F 8/10* (2018.01)
*G06F 8/20* (2018.01)

(52) U.S. Cl.
CPC . *G06F 8/10* (2013.01); *G06F 8/20* (2013.01)

(58) Field of Classification Search
None
See application file for complete search history.

(56) References Cited

U.S. PATENT DOCUMENTS

| | | | |
|---|---|---|---|
| 2019/0239100 A1* | 8/2019 | Pandey | H04W 24/04 |
| 2021/0174248 A1* | 6/2021 | Wetherbee | H04L 43/20 |
| 2021/0241168 A1* | 8/2021 | Sarferaz | G06F 9/5061 |
| 2021/0241170 A1* | 8/2021 | Sarferaz | G06N 20/20 |
| 2022/0180248 A1* | 6/2022 | Kirsche | G06N 3/088 |

* cited by examiner

*Primary Examiner* — Qing Chen
(74) *Attorney, Agent, or Firm* — MARSHALL, GERSTEIN & BORUN LLP; Randall G. Rueth

(57) ABSTRACT

Systems and methods for improving an onboarding process of a use case received from a user device using machine learning by automatically evaluating a potential to implement machine learning on the use case and automating the onboarding process, which may include receiving and processing an initial use case data set using a trained tractability machine learning model to generate a first determination whether the use case is machine learning tractable. The trained tractability machine learning model is trained using historical tractability data. Generating an onboarding machine learning model for solving the use case based at least upon the first determination the use case is machine learning tractable. Receiving a feedback data set and processing the initial use case data set and the feedback data set using the trained onboarding machine learning model.

20 Claims, 9 Drawing Sheets

AUTOMATED USE CASE EVALUATION, ONBOARDING AND GAMIFICATION

FIELD OF THE DISCLOSURE

The present disclosure is generally directed to techniques for improving an onboarding process for a machine learning use case. An intelligent system is used to automatically evaluate the potential for implementing machine learning on a use case, as well as automate the use case onboarding process.

BACKGROUND

Currently, evaluating whether a technology problem may be solved using machine learning is an exceedingly manual and time-intensive process. Generally, such evaluations begin with an intake process wherein information is gathered from a user interested in implementing machine learning to solve a problem or use case. Next, one or more subject matter experts conduct a manual review of the information. If the subject matter experts find the problem or use case to be solvable using machine learning, the subject matter experts may design a custom solution for the problem or use case. However, the determination of whether a problem is solvable using machine learning is inefficient and time-consuming. The subject matter experts may take weeks or even longer to evaluate a given problem or use case, which may lead to issues such as a missing a deadline and/or a change in the entire approach (e.g., due to non-compliance and/or regulatory issues).

Another issue facing subject matter experts, particularly in the consulting industry, is that even if a problem appears to be solvable using machine learning, the amount of time needed to solve the problem, and the number of resources, is difficult to calculate with any certainty.

Therefore, there is an opportunity for improved techniques for evaluating whether machine learning techniques can be used to solve problems and use cases, that avoid the inefficiencies and manual processes used in conventional techniques.

BRIEF SUMMARY

In one aspect, a computer-implemented method for improving an onboarding process of a use case received from a user device using machine learning by automatically evaluating a potential to implement machine learning on a use case and automating the onboarding process, according to an example. In an embodiment, the method may include receiving, by one or more processors, an initial use case data set from a user device; processing, by the one or more processors, the initial use case data set using a trained tractability machine learning model to generate a first determination whether the use case is machine learning tractable, wherein the trained tractability machine learning model is trained using historical tractability data; generating, based at least upon the first determination the use case is machine learning tractable, an onboarding machine learning model for solving the use case; receiving, by the one or more processors from one or more of a user device or a third party device, a feedback data set; and processing, by the one or more processors, the initial use case data set and the feedback data set using the trained onboarding machine learning model.

In another aspect, a computer system for improving an onboarding process of a use case received from a user device using machine learning by automatically evaluating a potential to implement machine learning on a use case and automating the onboarding process, according to an example. The computer system may include one or more processors; and a memory comprising instructions, that when executed, cause the computer system to receive an initial use case data set from a user device; process the initial use case data set using a trained tractability machine learning model to generate a first determination whether the use case is machine learning tractable, wherein the trained tractability machine learning model is trained using historical tractability data; generate an onboarding machine learning model for solving the use case based at least upon the first determination the use case is machine learning tractable; receive a feedback data set from one or more of a user device or a third party device; and process the initial use case data set and the feedback data set using the trained onboarding machine learning model.

In yet another aspect, a non-transitory computer-readable storage medium storing executable instructions that, when executed by a processor, cause a computer to improve an onboarding process using machine learning, according to an example. In an aspect, the computer may receive an initial use case data set from a user device; process the initial use case data set using a trained tractability machine learning model to generate a first determination whether the use case is machine learning tractable, wherein the trained tractability machine learning model is trained using historical tractability data; generate an onboarding machine learning model for solving the use case based at least upon the first determination the use case is machine learning tractable; receive a feedback data set from one or more of a user device or a third party device; and process the initial use case data set and the feedback data set using the trained onboarding machine learning model.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present aspects are not limited to the precise arrangements and instrumentalities shown, wherein.

DETAILED DESCRIPTION

Overview

Figure 1:
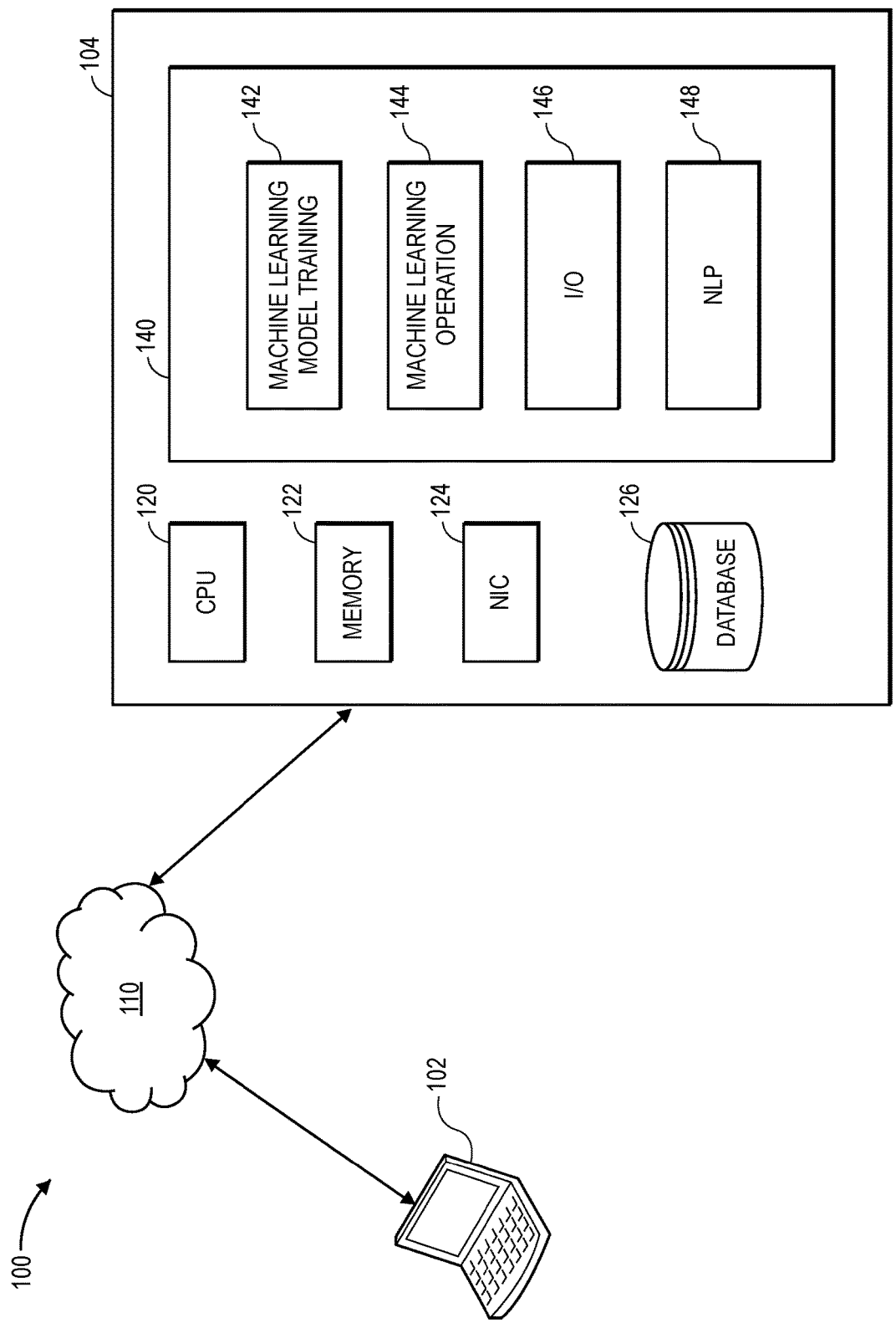
FIG. 1 depicts an exemplary computing environment in which evaluating machine learning tractability of a use case and automating onboarding may be performed, in some aspects.

The aspects described herein relate to, inter alia, employing machine learning ("ML") to automatically evaluate the ML tractability of a technology problem or use case (e.g., in the consulting industry), and then accelerate and automate the onboarding process from inception, to model development, and/or to deployment of a minimum viable product ("MVP") and/or more complex instantiation. Feedback may be used to improve the methods and systems discussed herein.

Specifically, the present techniques include methods and systems for receiving and processing information to determine whether a use case or problem is ML tractable. In an aspect, an intelligent system employs ML throughout the entire onboarding process including use case data intake, use case evaluation, use case onboarding, MVP model deployment and/or feedback. In some aspects, the present onboarding processes eliminate any human intervention except for gathering data from the user.

The intelligent system may guide the user through entering an initial use case data set via a user device. In one aspect, a graphical interface (GUI) displays step-by-step elements prompting the user for information. For example, an initial use case data set may include problem details including problem domain, problem data types, amount of available data, and/or if the available data is labeled. Based upon the initial use case data set, the intelligent system may determine if the use case is ML tractable, or if rather it is a better fit for a statistical/rule based deterministic system or a conventional manual problem-solving solution. If the use case is ML tractable, the intelligent system may predict one or more ML algorithms suited to solve the use case. If the intelligent system determines the use case is not ML tractable, the user may be informed of this, and also the intelligent system may provide the user with justification why the use case is not considered ML tractable. However, the user may provide instruction to override the intelligent system's recommendation against employing ML on the use case.

If employing ML on the use case, the intelligent system may similarly guide the user to provide a supplemental use case data set via a user device. In one aspect, the supplemental use case data set may include the data feature inputs (e.g., the business impact gained by implementing a solution, who the stakeholders from the business side are, the expected return on investment, and/or the risk to the business if the use case is not onboarded). Based upon the provided initial and supplemental use case data sets, the intelligent system may determine if a similar use case exists. If a similar use case does exist, the intelligent system may provide the stakeholder information of the similar use case to the user.

If a similar use case does not exist, or if the user does not wish to use and/or otherwise take advantage of an existing similar use case, the intelligent system may apply weights to the initial and/or supplemental use case data sets to generate a use case feasibility score. If the use case feasibility score meets at least a minimum threshold, the intelligent system may automatically initiate an onboarding process for the use case.

If the use case feasibility score does not meet at least the minimum threshold, the intelligent system may inform the user the use case is not ML tractable, which may also include a justification for that determination. The user then may then provide instruction to override the decision the use case is not ML tractable, and request a manual review with a domain expert analyst in which the domain expert analyst may review the feasibility of the use case and onboard the use case.

Once the use case is onboarded by the analyst or automatically by the intelligent system, the intelligent system may receive a feedback data set relating to the onboarding process from the user via a user device and/or from an analyst or other third-party via a third-party device. In an aspect, the feedback data set may be used to add to, improve, recalibrate, and/or (re)train the intelligent system and/or the onboarding process, as well any other suitable improvements to any and/or all functionality of the system and/or onboarding process. This provides the intelligent system the ability to improve upon itself over time.

Exemplary Computing Environment

FIG. 1 depicts a computing environment 100 in which the ML onboarding and gamification process may be performed, in accordance with various aspects discussed herein.

In the example aspect of FIG. 1, computing environment 100 includes client(s) 102, which may comprise one or more computers. In various aspects, client(s) 102 comprise multiple computers, which may comprise multiple, redundant, or replicated client computers accessed by one or more users. The environment 100 may further include an electronic network 110 communicatively coupling other aspects of the environment 100.

The client device 102 may be any suitable device (e.g., a laptop, a smart phone, a tablet, a wearable device, a blade server, etc.). The client device 102 may include a memory and a processor for, respectively, storing and executing one or more modules. The memory may include one or more suitable storage media such as a magnetic storage device, a solid-state drive, random access memory (RAM), etc. The client device 102 may access services or other components of the environment 100 via the network 110.

As described herein and in some aspects, the servers 104 may perform the functionalities as part of a cloud network or may otherwise communicate with other hardware or software components within one or more cloud computing environments to send, retrieve, or otherwise analyze data or information described herein. For example, in aspects of the present techniques, the computing environment 100 may comprise an on-premise computing environment, a multi-cloud computing environment, a public cloud computing environment, a private cloud computing environment, and/or a hybrid cloud computing environment. For example, any entity (e.g., a business) offering the intelligent onboarding system may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by the business offering the intelligent onboarding system. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 4G, 5G, etc.). Generally, the network 110 enables bidirectional communication between the client device 102 and the servers 104. In some aspects, network 110 may comprise a cellular base station, such as cell tower(s), communicating to the one or more components of the environment 100 via wired/wireless communications based on any one or more of various mobile phone standards, including NMT, GSM, CDMA, UMMTS, LTE, 5G, or the like. Additionally or alternatively, network 110 may comprise one or more routers, wireless switches, or other such wireless connection points communicating to the components of the environment 100 via wireless communications based on any one or more of various wireless standards, including by non-limiting example, IEEE 802.11a/b/c/g (WIFI), Bluetooth, and/or the like.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in memory 122 and/or the database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 140, implemented as respective sets of computer-executable instructions (e.g., one or more source code libraries, trained ML models such as neural networks, convolutional neural networks, etc.) as described herein.

The memory 122 and/or database 126 may also store one or more data sets provided by the user. A data set may include, but is not limited to, a collection of information/data that is composed of separate elements but may be manipulated as a unit by a computer, processor 120, or the like. The data set may be related (e.g., data related to a use case) or unrelated, and may only have one element in some circumstances or may include multiple data sets. The term data and data set may be used interchangeably herein.

In general, a computer program or computer based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data and be used to train and/or operate one or more ML/artificial intelligence ("AI") models.

The ML training module 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

In various aspects, the ML model, as described herein, may be trained using a supervised or unsupervised ML program or algorithm. The ML program or algorithm may employ a neural network, which may be a convolutional neural network, a deep learning neural network, or a combined learning module or program that learns in two or more features or feature data sets (e.g., structured data, unstructured data, etc.) in a particular area of interest. The ML programs or algorithms may include natural language processing (NLP), semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other ML algorithms and/or techniques. In some aspects, the ML based algorithms may be included as a library or package executed on server(s) 104. For example, libraries may include the TensorFlow based library, the Pytorch library, and/or the scikit-learn Python library.

ML may involve identifying and recognizing patterns in existing data (e.g., data from previous use cases which were ML tractable) in order to facilitate making predictions, classifications, and/or identifications for subsequent data (e.g., using models to determine ML tractability for a use case, a use case feasibility score, a scoring threshold, system and/or process improvements). Example use cases for which ML may be tractable may include dynamic pricing, product recommendations, customer segmentation, image/video recognition, fraud detection, demand forecasting and/or sentiment analysis.

ML model(s) may be created and trained based upon example data (e.g., training data) inputs or data (which may be termed "features" and "labels") in order to make valid and reliable predictions for new inputs. In supervised ML, an ML program operating on a server, computing device, or other processor(s), may be provided with example inputs (e.g., features) and their associated, or observed, outputs (e.g., labels) in order for the ML program or algorithm to determine or discover rules, relationships, patterns that map such inputs (e.g., features) to the outputs (e.g., labels), for example, by determining and/or assigning weights or other metrics to the model across its various feature categories. The process of creating and training ML models may result in models that are digital objects that may be stored in memory or a database, and used later after training to make accurate predictions. Such models and the rules/relationships they encode may be provided subsequent inputs in order for the model, executing on the server, computing device, or other processor(s), to predict, based on the discovered rules, relationships, or model, an expected output.

In unsupervised ML, the server, computing device, or otherwise processor(s), may find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised ML may also include retraining, relearning, or otherwise updating models with new, or different, information, which may include information received, ingested, generated, or otherwise used over time. The disclosures herein may use one or both of such supervised or unsupervised ML techniques.

In some aspects, the computing modules 140 may include an ML operation module 144, comprising a set of computer-executable instructions implementing ML loading, configuration, initialization and/or operation functionality. The ML operation module 144 may include instructions for storing trained models (e.g., in the electronic database 126). As discussed, once trained, the one or more trained ML models may be operated in inference mode, whereupon when provided with de novo input that the model has not previously been provided, the model may output one or more predictions, classifications, etc., as described herein.

In some aspects, the computing modules 140 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as computer network 110 and/or the client device 102 (for rendering or visualizing) described herein. In some aspects, servers 104 may include a client-server platform technology such as ASP.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. I/O module 146 may facilitate I/O components (e.g., ports, capacitive or resistive touch sensitive input panels, keys, buttons, lights, LEDs), which may be directly accessible via, or attached to, servers 104 or may be indirectly accessible via or attached to the client device 102. According to some aspects, an administrator or operator may access the servers 104 via the client device 102 to review information, make changes, input training data, initiate training via the ML model training module 142, and/or perform other functions (e.g., operation of one or more trained models via the ML operation module 144).

In some aspects, the computing modules 140 may include a natural language processing (NLP) module 148, comprising a set of computer-executable instructions implementing natural language processing functionality.

In an embodiment of the present systems and methods discussed herein, the intelligent system may use ML to completely automate the onboarding process, eliminating the need for human intervention. In such an embodiment, one or more servers 104 are configured to provide the intelligent system 105 and automated the onboarding process and techniques discussed herein.

For example, in an aspect, the intelligent system 105 may receive an initial use case data set from a user via a user device, which the intelligent system may process using ML use to determine whether a use case represented in the initial use case data set is ML tractable.

In an example, the user device may be a client device 102 or via I/O module 146, or any other suitable means for providing data to the intelligent system 105. In an aspect, the intelligent system 105 may host a website configured to provide an application (e.g., a mobile application) to receive an initial use case data set. In an aspect, the intelligent system 105 may store code in memory 122 which when executed by CPU 120 may provide the website and/or application.

In an aspect, the user may access the website and/or application over a network 110 via a user device, such as client device 102. In an aspect, the application may use a GUI to guide the user through a step-by-step question and answer process until the initial use case data set has been captured by the intelligent system 105. Initial questions and/or use case data may relate to information regarding the project and/or business problem, how much data is available related to the use case, and/or if the available data labeled, as well as any other suitable information related to the use case. In an aspect the intelligent system 105 may store the initial use case data set in database 126. The data set may be cleaned, labeled, vectorized, weighted and/or otherwise processed, especially processing suitable for data used in any aspect of M L.

In a further aspect, anytime the intelligent system 105 evaluates one or more use case data sets, the associated data may be stored in database 126. In an aspect, the intelligent system 105 may use the stored data set to generate, train and/or retrain an ML model, update and/or otherwise improve the intelligent system 105, and/or for any other suitable purpose.

In operation, ML model training module 142 may access database 126 or any other data source for training data suitable to generate an ML model appropriate to determine the ML tractability of a use case, i.e., a tractability machine learning model. The training data may be a sample data set with assigned relevant and comprehensive labels (classes or tags) used to fit the parameters (weights) of an ML model with the goal of training it by example. In an aspect, training data may include historical tractable data from past use cases which were determined to be either ML tractable or not tractable. Historical tractability data may include one or more of a problem domain, problem data types, amount of available data, or whether the available data is labeled. In an aspect, once an appropriate model is trained and validated to provide accurate predictions of use case tractability from use case data, e.g., a tractability machine learning model generated by ML training module 142, the trained model may be loaded into ML operation module 144 at runtime and may process the initial use case data set and may generate as an output a determination whether the use case is ML tractable.

While various embodiments, examples, and/or aspects disclosed herein may include training and generating ML models for the intelligent system 105 to load at runtime, it is also contemplated that an appropriate trained ML model may already exist (e.g., in database 126) such that the intelligent system 105 may load an existing trained ML model at runtime. It is further contemplated that the intelligent system 105 may retrain, update and/or otherwise alter an existing ML model before loading the model at runtime.

In another aspect, the intelligent system 105 may provide a determination whether another use case is similar to the user's use case. Similarly, the intelligent system 105 may access database 126 and/or any other source of data to train a model, e.g., a similarity ML model, which may contain data from other use cases, and/or any other suitable training data. In a further aspect, the ML training module 142 may generate a model trained with historical use case data which may include one or more of a project type, a project cost, or a project client identity, data with labels related to the type of business problem, business impact gained by implementing a solution, business stakeholders, expected revenue, and/or risk if the use case is not onboarded. The historical use case data may be manually curated by the consulting company, using experience of many years to encode information regarding which problems have been historically solved using machine learning, and which have not. In an aspect, once trained with historical use case data, the similarity machine learning model may allow the intelligent system 105 to determine whether a similar use case exists. In an aspect, ML operation module 144 may load an appropriate and trained model (e.g., similarity ML model generated by ML training module 142) at runtime and may process the user's initial use case data set and/or supplemental use case data set, after which the intelligent system 105 may generate a determination whether a similar use case exists.

In another example, the intelligent system 105 may generate a use case feasibility score. In an aspect, the intelligent system 105 may access database 126 and/or another data source which may store use case data and/or any other suitable data used for training an ML model capable of generating a use case feasibility score. Using training data, ML model training module 142 may generate a model capable of determining a use case feasibility score, e.g., a scoring machine learning model. In an aspect, the trained model may then be loaded into ML operation module 144 at runtime and may process the initial use case data set which may be weighted and/or the supplemental use case data set which may be weighted, after which the intelligent system 105 may generate a use case feasibility score. To generate the model capable of determining a use case feasibility score, the training data may include historical weighted initial use case data which may include one or more of a problem domain, problem data types, amount of available data, or whether the available data is labeled; and historical weighted supplemental use case data which may include one or more of data feature inputs, business impact gained by implementing a solution, business stakeholders, expected revenue, or risk if the use case is not implemented.

In another aspect, the intelligent system 105 may automate the onboarding process for a use case which may be ML tractable. The onboarding may include one or more of an automated data access process; a risk and compliance process; a procuring infrastructure process; a dev ops process; a load testing process; a security pen testing process; generating a project execution plan; or an MVP process which may include generating an MVP model based upon the initial use case data set and/or the supplemental use case data set; deploying the MVP model to a test environment; and generating user credentials for the test environment which are provided to the user, e.g. via a user device. In an aspect, the intelligent system may use ML model training module 142 to generate one or more models to carry out the onboarding, e.g., an onboarding machine learning model. In an aspect, once one or more suitable onboarding ML models have been generated and trained which are capable of onboarding the new use case, the intelligent system 105 may load the one or more trained models at runtime into ML operation module 144, receive and process the initial and/or supplemental use case data sets (e.g., from database 112) to automatically onboard the use case.

In another aspect, the intelligent system 105 may receive a feedback data set e.g., from a user via a user device such as client device 102 or I/O module 146, domain expert analyst and/or third party via a third-party device such as client device 102 or I/O module 146, the feedback data set related to any and/or all aspects of the onboarding process. The intelligent system 105 may use the feedback data set to generate improvements to any and/or all aspects of the onboarding process. In another example, the intelligent system 105 may automatically generate a feedback data set and/or be able to improve any and/or all aspects of the entire onboarding process and/or system without human intervention and/or human feedback. Similar to other examples and in an aspect, the intelligent system may use ML model training module 142 to generate a model trained using training data such as historical feedback data which may reside in database 126, may load the appropriate model at runtime into ML operation module 144 inputting the feedback data set, and may generate one or more improvements to the onboarding.

Exemplary High-Level System Flow

Figure 2:
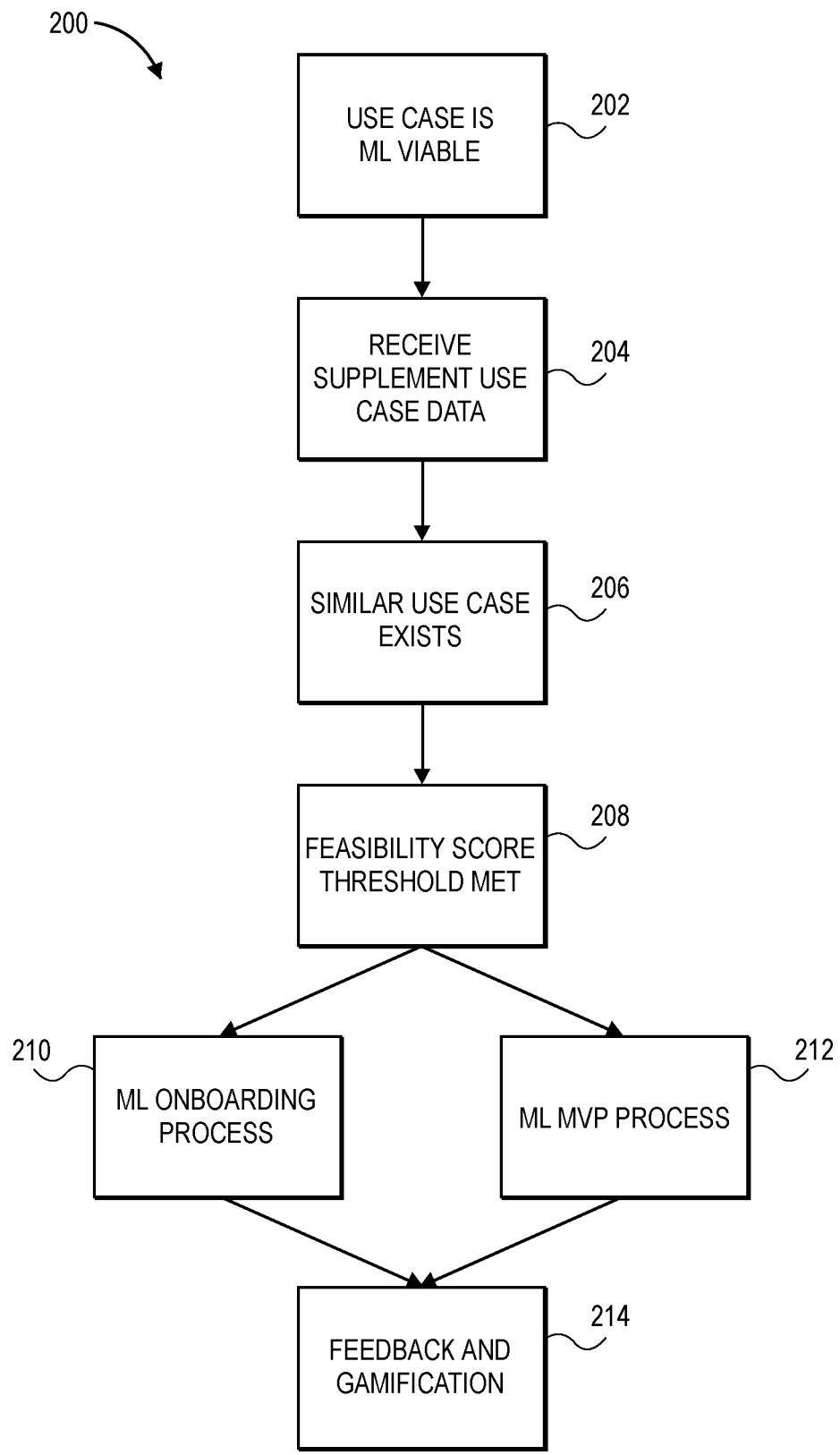
FIG. 2 is an exemplary block flow diagram depicting a high-level system flow for a computer-implemented method for evaluating machine learning tractability of a use case and automating onboarding, according to an aspect.

FIG. 2 is an exemplary block flow diagram depicting a computer-implemented method 200 for improving an onboarding process of a use case received from a user device using ML. The method 200 may evaluate ML tractability of a use case and automate the onboarding process, according to some aspects. In general, the method 200 may be carried out by the components of the computing environment 100 (e.g., the servers 104).

In block 202, the user may provide an initial use case data set for the intelligent system 105 to determine if the use case is ML tractable. In an aspect, the intelligent system 105 may receive the initial use case data set from the user via a user device, such as client device 102 or I/O module 146. In an aspect, the intelligent system may provide and/or host a webpage which may use an application to guide the user through the data intake process by proposing one or more questions related to the use case for the user to answer. The questions may include, but are not limited to, details about the problem to be solved, the amount of data that may be available and if the data is labeled. In an example, the user may access the webpage over network 110 using client device 102. The intelligent system 105 may use NLP module 148 to process the user's answers to the questions and may store the initial use case data set in database 126. The intelligent system 105 may then determine if the use case is ML tractable, which may include loading one or more appropriately trained ML models at runtime which may use the initial use case data set as input, and output a determination if the use case is ML tractable, as discussed in more detail herein.

Once the intelligent system 105 determines the use case is ML tractable, the intelligent system 105 may receive from the user device such as via I/O module 146 or client device 102, a supplemental use case data set at block 204. Similar to the initial use case data set, the supplemental use case data set may be input via a webpage using an application which may guide the data intake process by proposing one or more questions for user to answer. The intelligent system 105 may host a webpage the user may access over network 110 using a user device, such as client device 102. The intelligent system 105 may use NLP module 148 to process the user's responses. The intelligent system 105 may store the supplemental use case data set in database 126.

At block 206, the intelligent system 105 may determine based upon at least one or more of the initial use case data set and/or supplemental use case data set whether a similar use case exists. As discussed in further detail herein, the intelligent system 105 may train an ML model, i.e., a similarity machine learning model, using historical use case data which may be stored in database 126. At runtime, the trained similarity machine learning model may be loaded in ML operation module 144 and used to determine a similar use case.

If the intelligent system 105 determines a similar use case does not exist, the intelligent system 105 may generate a use case feasibility score. Generating the score may include weighting the initial and/or supplemental use case data set when modeling the data, which may include one or more of the ML model training module 142 or ML operation module 144. At block 208, the intelligent system 105 may determine if the use case feasibility score at least meets a threshold, which may similarly use ML. If the use case feasibility score does at least meet the threshold, the intelligent system 105 onboards the use case at blocks 210 and 212.

The automatic onboarding process may use ML as discussed above and may not require any human intervention. The onboarding may include using a trained ML model to generate code for, and deploy, an MVP at block 212. In an aspect, the intelligent system 105 may load training data into ML model training module 142 to generate one or more onboarding-appropriate models. The training data may include use case data and/or any other suitable training data which may be stored in database 112. In an aspect, once one or more appropriate ML models have been generated capable of onboarding a new use case, e.g., by ML model training module 142, the intelligent system 105 may load the one or more trained models at runtime into ML operation module 144, receive and process the data for the client's use case (e.g., from database 112) and automatically onboard the use case at blocks 210 and 212.

Once the onboarding process is complete, at block 214 the user may be able to provide feedback on a user device, e.g., on client device 102, to the intelligent system 105. The intelligent system 105 may use the feedback data set to recalibrate the onboarding system, (re)train ML models, and/or for any other suitable purpose which may lead to improvement of the system directly or indirectly. Providing feedback at block 214 may be considered gamification and in an aspect may involve one or more of a user score, directed questions for a user, and/or benchmarking. The intelligent system 105 may store the feedback data set in database 126. Alternatively or in addition to the user, other parties may be involved in the feedback process of block 214, such as a domain expert analyst and/or subject matter expert.

As discussed in further detail below, at one or more points in the onboarding process 200, the intelligent system 105 may determine a use case is not ML tractable. This may include, but is not limited to, at block 202 based upon the initial use case data set and/or at block 208 if a use case feasibility score threshold is not met. The intelligent system 105 may inform the user (e.g., via client device 102) of a determination that a use case is not ML tractable, which may also include justification for the decision. When the intelligent system 105 determines a use case is not ML tractable, the user may have the option to override the determination, which may involve providing an override instruction to the intelligent system 105, e.g., providing the instruction via a user device. In the case of block 202, the user overrides the decision and moves to block 204 and may provide a supplemental use case data set. In the case of block 208 if a feasibility score is not met, the user may request manual review by a domain expert analyst, who may then onboard the user's use case. Additionally, at block 206 if an intelligent determination is made that a similar use case exists, the user may likewise have the option to override that determination or otherwise decline to take advantage of a similar use case, then moving to block 208.

Exemplary Use Case Categorization

Figure 3:
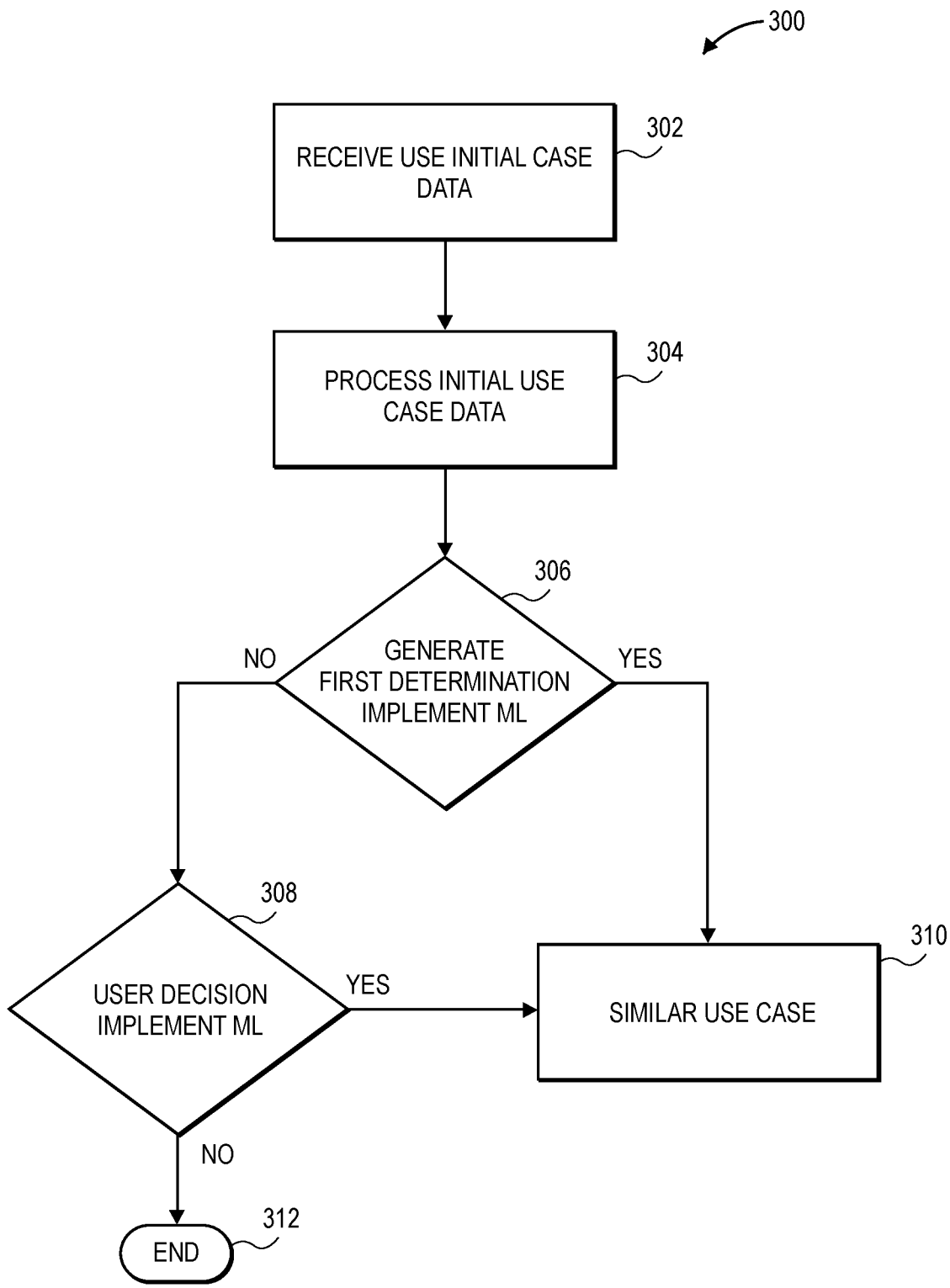
FIG. 3 is an exemplary block flow diagram depicting a computer-implemented method for capturing a use case data set to evaluate machine learning tractability, according to an aspect.

FIG. 3 discusses in further detail a method 300 in which the intelligent system 105 may determine whether a use case may be ML tractable based upon an initial use case data set.

If the user believes they may have a business, consulting and/or other problem or use case worthy of implementing ML, the intelligent system 105 may require at block 302 the user provide information about the use case in the form of an initial use case data set. In one aspect, the initial use case data set may include information related to the business problem, how much data is available regarding the user case, and/or if the available data is labelled. The intelligent system 105 may guide the user to input the initial use case data set on a user device via a webpage using an application to provide one or more questions for user to answer. The intelligent system 105 may host the webpage, and the user may access the website over network 110 using client device 102 and the intelligent system 105 may receive the user data via I/O module 146. The initial use case data set may allow the intelligent system 105 to determine at block 306 if a use case is ML tractable, and if not, the intelligent system 105 may determine and inform the user whether the use case is more appropriate for a statistical/rule based deterministic system.

At block 304 of the method 300, intelligent system 105 may process the initial use case data set using ML, and in an example load a tractability machine learning model into ML operation module 144 at runtime to process the initial use case data set such that at block 306, the intelligent system 105 may determine whether the use case is ML tractable. In one aspect, technologies which may be used in processing and/or interpreting the initial use case data set at block 304 may be natural language processing (NLP) leveraging vector databases and sentence embeddings. The intelligent system 105 may use NLP module 418 to translate any human language to mathematical vectors that ML algorithms may understand. The processing may also include feature extraction and/or labeling the data.

At block 306, the intelligent system 105 may generate a first determination whether the use case is ML tractable and may use ML for this process. The intelligent system 105 may use historical tractability data as training data for ML model training module 142 to create a trained tractability ML model which may generate the first determination. Historical tractability data may include one or more of a problem domain, problem data types, amount of available data, or whether the available data is labeled. The trained tractability ML model may be loaded into ML operation module 144 at runtime and use the initial use case data set which may be stored in database 126 to generate a determination whether the use case is ML tractable. If ML tractable, the intelligent system 105 may indicate to the user, e.g., via client device 102, whether the use case is a classification, regression, time series model, clustering, or another type of ML algorithm may be applicable. The method 300 may then move to block 310 and the intelligent system 105 may determine if a similar use case exists.

Alternatively, if at block 306 the intelligent system 105 determines the use case is not ML tractable, the intelligent system 105 may provide to the user via the user device justification for that determination. At block 308 the user may accept the determination the use case is not ML tractable, in which case the process ends at block 312. However, at block 308 the user may provide instruction to the intelligent system 105 to override the determination generated at block 306, in which case the method 300 moves to block 310 for the intelligent system 105 to determine if a similar use case exists. This brings the user to the same block they would have arrived at had the intelligent system 105 originally determined the case was ML tractable.

Exemplary Supplemental Use Case Data Capture

Figure 4:
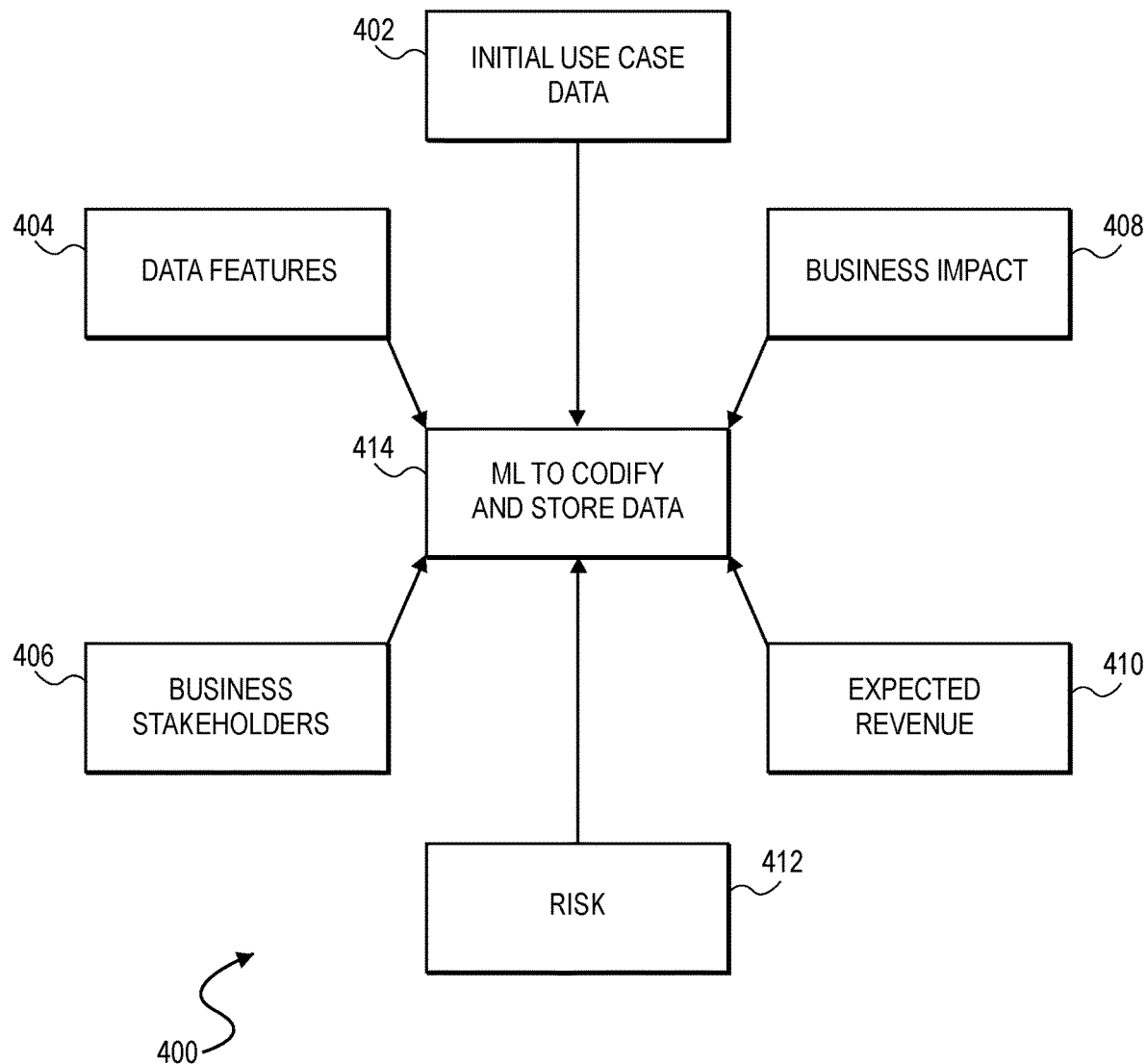
FIG. 4 is an exemplary block flow diagram depicting a computer-implemented method for capturing a supplemental use case data set, according to an aspect.

FIG. 4 provides further detail regarding a method 400 in which the intelligent system 105 may determine if there is a previous use case similar to the user's use case. For the intelligent system 105 to make this determination, the user may need to provide additional details beyond the initial use case data set, i.e., a supplemental use case data set.

At block 402 the initial use case data set received in block 302 may propagate to the method 400 and the user may additionally provide supplemental use case data set. As with the initial use case data, the intelligent system 105 may capture the supplemental use case data set from the user via client device 102 through a guided process, such as an application on a website. In one aspect of the method 400, the supplemental use case data set may include receiving from the user data feature inputs in block 404, business impact gained by implementing a solution in block 408, who the stakeholders from the business side are in block 406, the expected return on investment/revenue in block 410, and the risk to the business if the use case is not implemented in block 412. As was the case with the initial use case data set, the intelligent system 105 in block 414 may use ML to process, codify and store (e.g., in database 126) the supplemental use case data set in ways that ML models can use the data, e.g., by labelling the data. The intelligent system 105 may codify and store data from the user's use case, as well as past projects and/or use cases. In one aspect, technologies which may be used in this process and/or to interpret the use case data sets are natural language processing (NLP) leveraging vector databases and sentence embeddings. The intelligent system 105 may use NLP module 418 to translate any human language to mathematical vectors that ML algorithms may understand.

Exemplary Similar Use Case Determination

Figure 5:
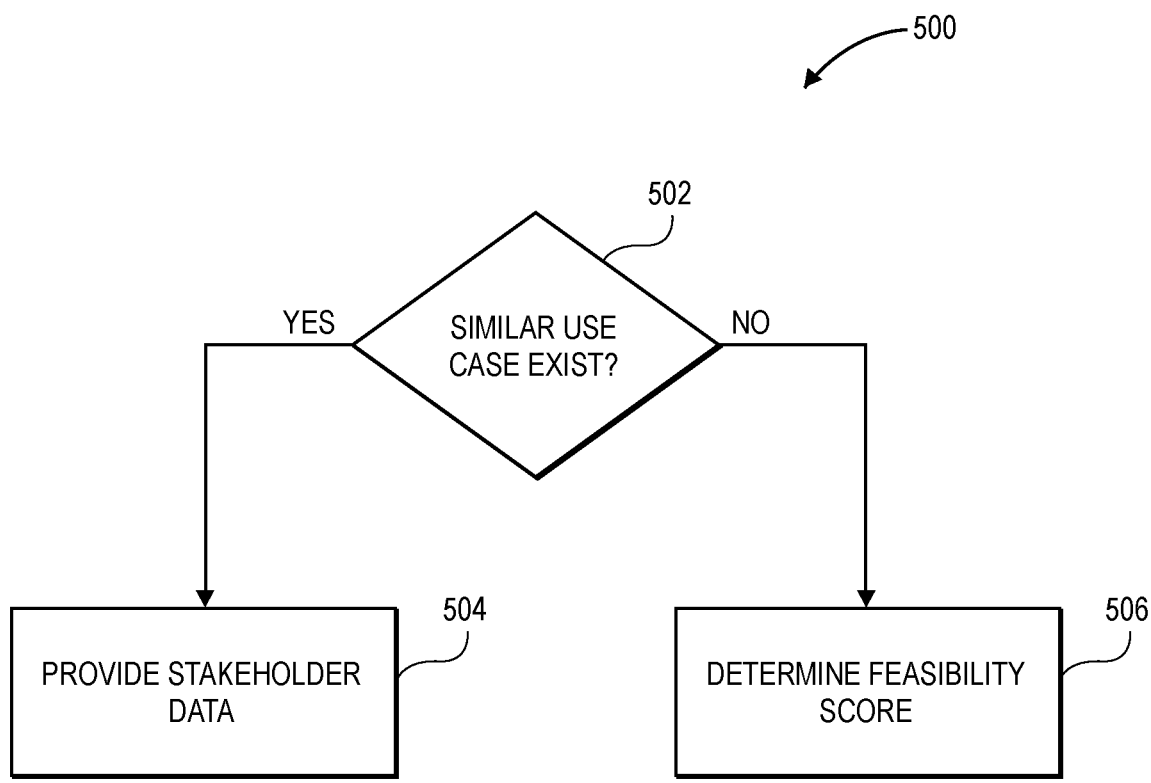
FIG. 5 is an exemplary block flow diagram depicting a computer-implemented method for determining if a similar machine learning use case exists, according to an aspect.

FIG. 5 provides further detail regarding a method 500 for determining if a similar use case exists, according to an aspect. The intelligent system 105 may determine in block 502 whether a similar use case exists, which may involve using an appropriate ML model, e.g., a similarity ML model. The intelligent system 105 may access database 126 and/or any other source of training data to train the similarity ML model. The training data may be historical use case data, i.e., from other use cases, and/or any other suitable training data. In a further aspect, the ML training module 142 may generate and train similarity ML model with historical use case data which may include use case data with labels related to the type of business problem, business impact gained by implementing a solution, business stakeholders, expected revenue, risk if the use case is not onboarded. In an aspect, once trained with historical use case data, the trained similarity ML model may allow the intelligent system 105 to determine at step 502 whether a similar use case exists. In an aspect, ML operation module 144 may load the similarity ML model at runtime and may process the user's initial use case data set and/or supplemental use case data set, after which the intelligent system 105 may generate at step 502 a determination whether a similar use case exists.

When a similar use case exists, at block 504 the intelligent system 105 may provide the user, e.g., via client device 102, details related the similar use case. The similar use case details may be accessible to the intelligent system 105, e.g., via database 126 or another repository. In one aspect, the similar use case details may include stakeholder information, which may beneficially allow the user to contact the stakeholder.

If the intelligent system 105 determines that a similar use case does not exist, the user may likewise be informed, e.g., via client device 102, and may additionally be provided the justification for that determination. In this aspect, the process 500 may next proceed to block 506 where the intelligent system 105 determines a use case feasibility score. In one aspect, ML training module 142 may generate a model appropriate for determining a feasibility score. In a further aspect, ML operation module 144 loads the model and generates the feasibility score from at least the initial case data set received in block 302 and/or the supplemental use case data set which may include feature inputs received in block 404, business impact gained by implementing this solution received in block 408, who the stakeholders from the business side are received in block 406, the expected return on investment/revenue received in block 410, and the risk to the business if the use case is not implemented received in block 412. The intelligent system 105 may also weight the initial and/or supplemental use case data sets. For example, a feature of the data such as business impact gained may be impactful in determining the feasibility score than the risk to the business data, and as such these features of the data sets may be weighted appropriately for processing by an ML model when determining the feasibility score. The intelligent system 105 may process one or more of the weighted use case data sets with an appropriate model and may generate a feasibility score. In one aspect, the feasibility scoring may include regression scoring and predicting a numeric value.

Exemplary Feasibility Score Threshold

Figure 6:
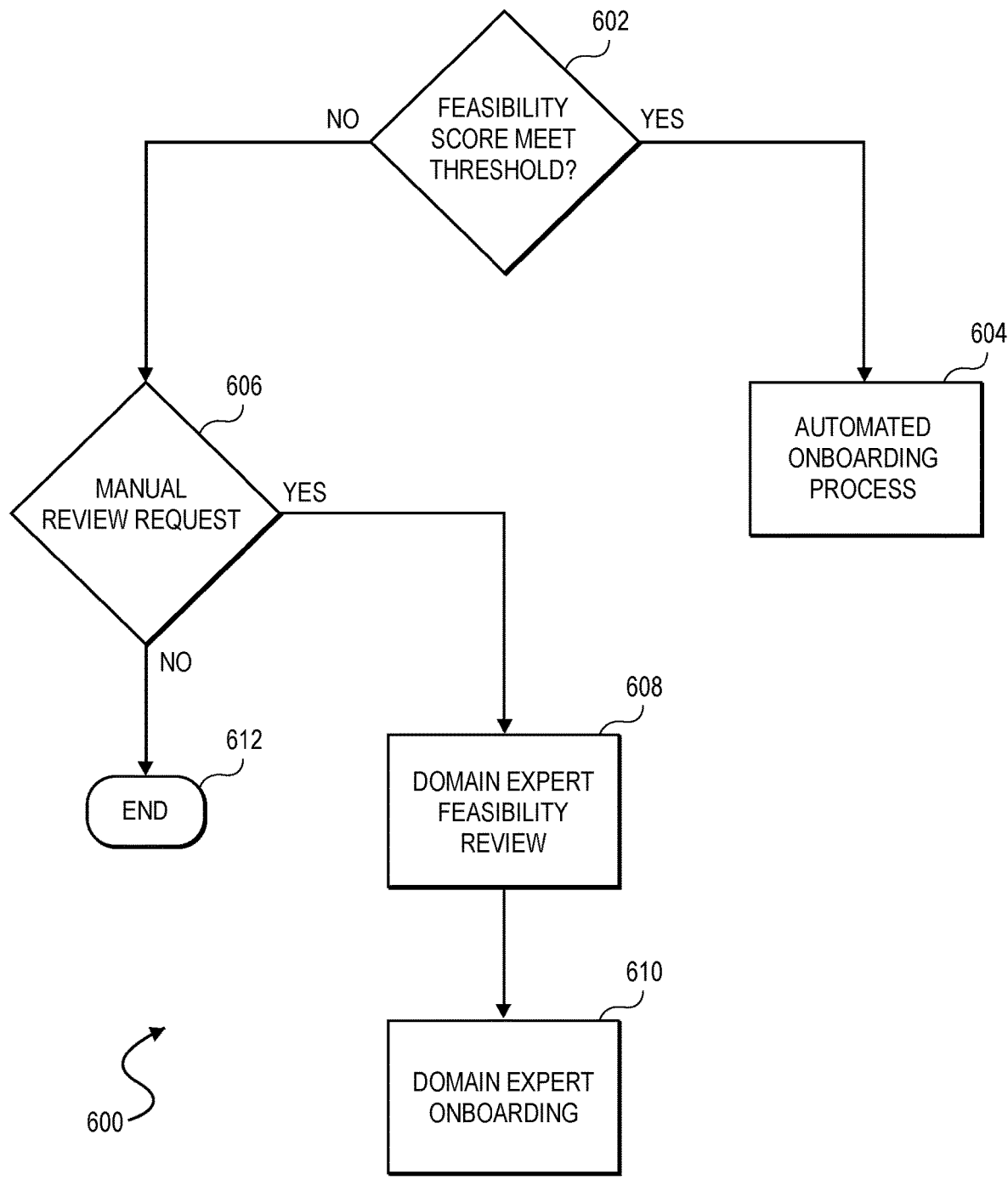
FIG. 6 is an exemplary block flow diagram depicting a computer-implemented method for determining whether a use case feasibility score meets a threshold according to an aspect.

According to FIG. 6, in an exemplary method 600 the intelligent system 105 may determine whether the use case feasibility score at least meets a threshold in block 602. In one aspect, the intelligent system 105 may determine the threshold using a model generated by ML training module 142 trained with data from past use cases which may have been determined to be ML tractable and/or cases which were determined not to be ML tractable. In an aspect, the use case feasibility score must meet an importance threshold of 60% or more.

If the intelligent system 105 determines the use case feasibility score meets or exceeds a threshold in block 602, the intelligent system 105 may inform the user of this determination (e.g., via client device 102), and may initiate an automated onboarding process in block 604.

If the use case feasibility score does not meet the threshold, intelligent system 105 may likewise inform the user of that determination and in turn considers the use case as not ML tractable. In an aspect, the user may then have the option to provide instruction to the intelligent system, e.g., via a user device, to request a manual review with a domain expert analyst in block 606, in effect overriding the determination the use case feasibility score does not meet the threshold and the use case is not ML tractable. In an aspect, the manual review in block 606 may involve a domain expert analyst reviewing the use case feasibility in block 608. In an aspect, the domain expert analyst may directly onboard the use case in block 610. If the user accepts the determination the feasibility score does not meet a threshold, the process ends in block 612

Exemplary ML Onboarding

Figure 7:
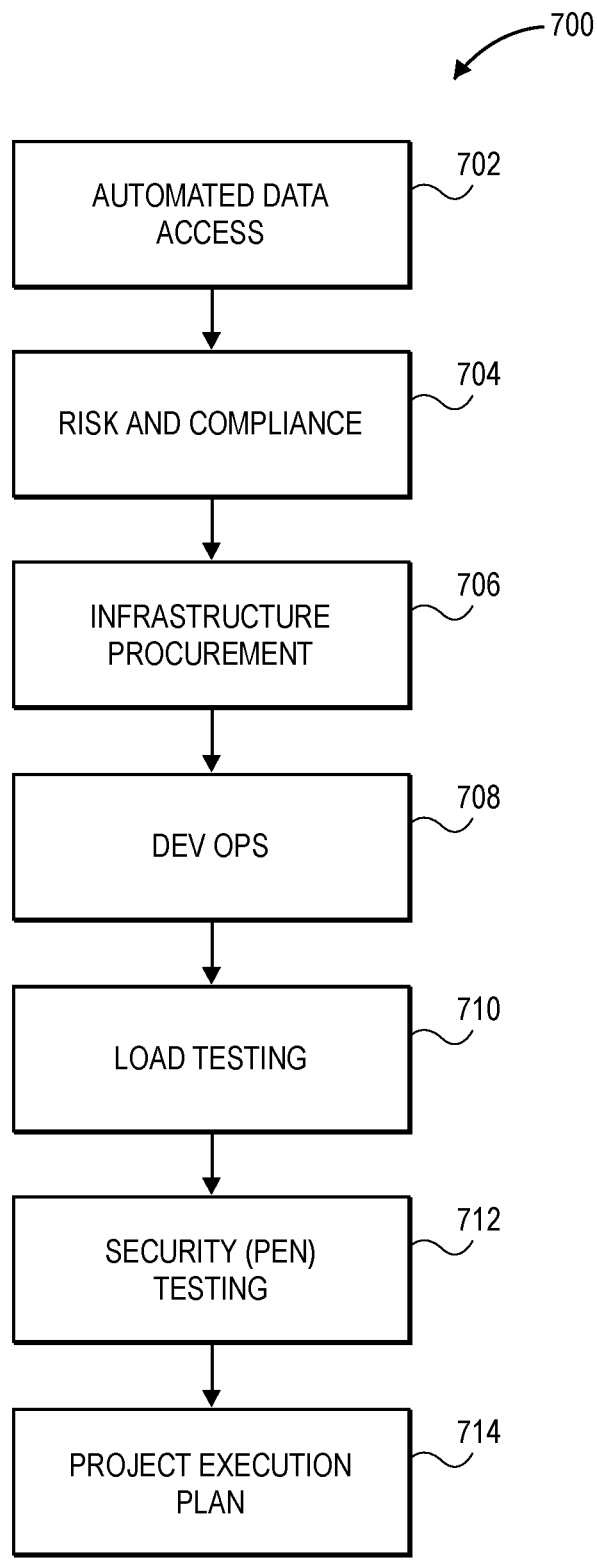
FIG. 7 is an exemplary block diagram depicting a computer-implemented method for an automated onboarding process, according to an aspect.

FIG. 7 provides further detail of an aspect of the automated onboarding process 700, also referred to in block 604. The intelligent system 105 may carry out process 700 using ML to automate one or more aspects of onboarding the use case. In an aspect, once the onboarding process begins everything is templatized, such that the information requested by the template results in a no code and/or low code implementation. In one aspect, the intelligent system 105 may automatically initiate involvement with the various systems and stakeholders involved in the project and/or onboarding, which may include automatic data access system approval (or/downstream) in block 702; risk management system (legal and compliance) in block 704; infrastructure procurement system in block 706; Dev Ops in block 708; load test (internet facing) in block 710; security testing (Pen test) in block 712; and project execution plan in block 714 which is sent to the user.

In one aspect, the intelligent system 105 may include a micro-servicing process that follows a predefined pattern, whether existing or new. In an aspect, if any part of the onboarding process may be improved, the intelligent system 105 includes a check to identify process improvements, which may or may not also incorporate feedback from the user, a domain expert analyst, and/or a third party. In an aspect, human intervention is only on an as-need basis.

Exemplary Code Generation and MVP Deployment

Figure 8:
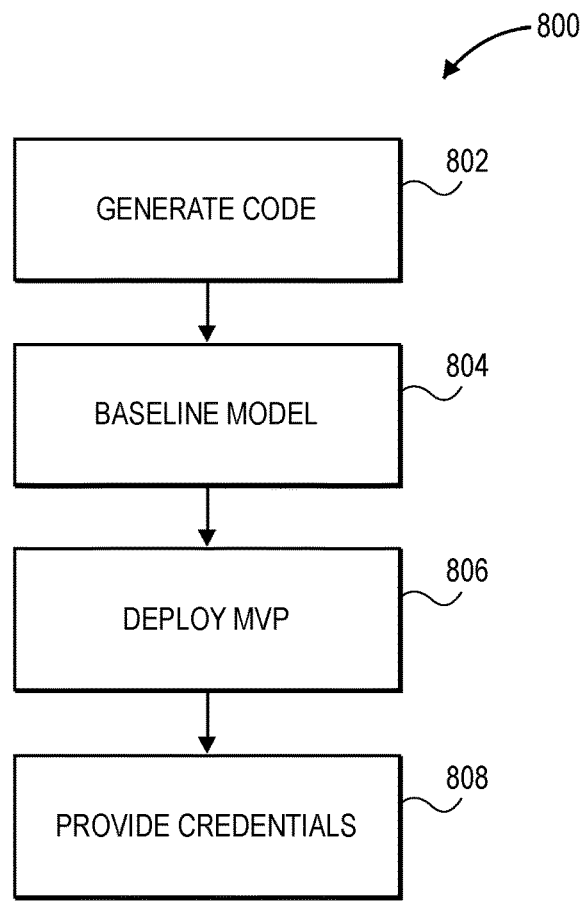
FIG. 8 is an exemplary block diagram depicting a computer-implemented method for an automated code generation and MVP model deployment process, according to an aspect.

FIG. 8 provides further detail on another aspect of the automated onboarding process, an automated MVP process 800 (also referred to in block 604), which may include the generation of code in block 802, baseline modelling in block 804 and deployment of an MVP in block 806. In an aspect, the MVP process 800 like the onboarding process 700, is automated and may be carried out by the intelligent system 105 using ML without human intervention. The intelligent system 105 may take granular requirements from the intelligent vectorization process using NLP, e.g., using NLP module 148 previously discussed and shown in FIG. 4, and may generate code using a code generator in block 802.

The intelligent system 105 may then use a baseline ML model in step 804 and deploy the MVP in a development environment in step 806. The intelligent system 105 may then provide the user credentials in step 808 to the user (e.g., via a user device), so the user may login, access and leverage the environment.

Exemplary Feedback & Gamification

Figure 9:
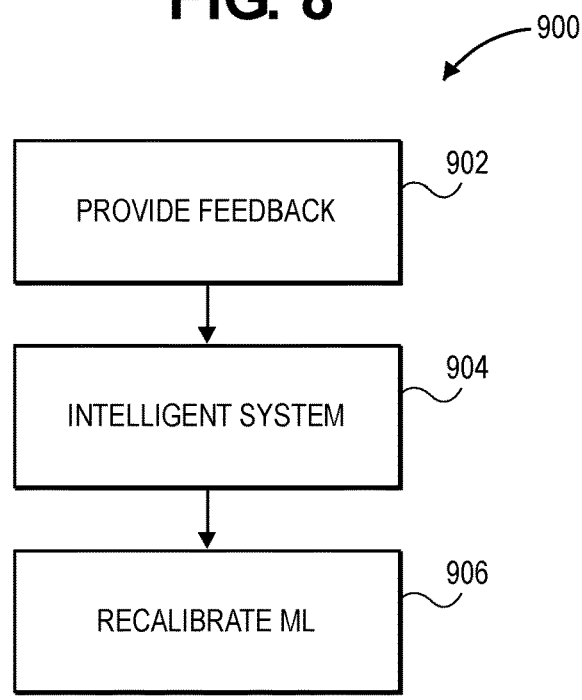
FIG. 9 is an exemplary block flow diagram depicting a computer-implemented method for feedback and gamification, according to an aspect.

In FIG. 9, after the automated onboarding process 700 and the MVP process 800 are completed such that the user's use case may now be completely onboarded by the intelligent system 105, a feedback and gamification process 900 may be reached. In an aspect, the process 900 may also be reached after the domain expert analyst manually onboards the use case in block 610, as in both scenarios the use case may be onboarded into a central repository. In block 902, the user, or analyst if manually onboarded, may provide feedback regarding the onboarding process and/or any other suitable feedback, to the intelligent system 105, for example via a user device such as client device 102. In block 904, the intelligent system 105 may receive, process and/or store the feedback data set, which may include NLP module 148, labelling the data, and any other suitable data processing. In block 906 the intelligent system 105 may update, improve and/or recalibrate the onboarding process. In an aspect, future ML models may be able to learn from the feedback data set, which may be stored in database 126. In an aspect, the intelligent system 105 may continuously and/or intermittently evaluate and improve upon itself, the onboarding process or any other suitable aspect, without any human feedback or intervention.

The feedback received may include gamification and involve one or more of scoring a user, directing questions to a user, and/or benchmarking to be part of the feedback data set. Other parties in addition to, or outside of the user, may be involved in the feedback process, such as a domain expert analyst and/or subject matter expert.

Figure 10:
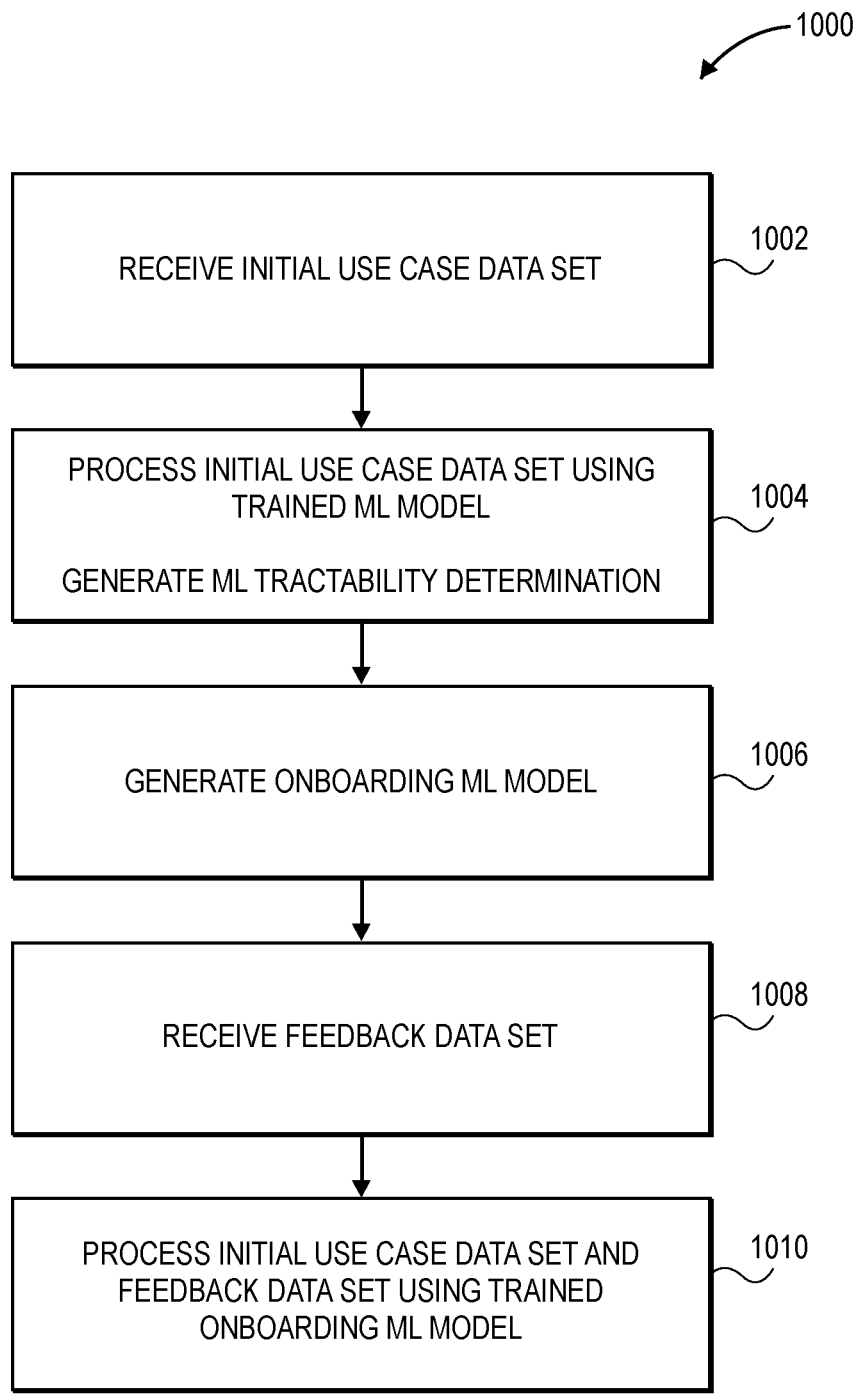
FIG. 10 is an exemplary block flow diagram depicting a computer-implemented method for evaluating machine learning tractability of a use case and automating onboarding, according to an aspect.

Exemplary Method for Evaluating Use Case Tractability and Automating Onboarding According to FIG. 10, an exemplary method 1000 for improving an onboarding process of a use case received from a user device, using ML by automatically evaluating a potential to implement ML on the use case and automating the onboarding process. The method 1000 may include at block 1002 receiving, by one or more processors 120, an initial use case data set from a user device. In an example, the one or more processors 120 of intelligent system 105 may receive the initial use case data set via client device 102. The initial use case data set may include a problem domain, problem data types, amount of available data, or whether the available data is labeled. At block 1004 processing, by the one or more processors 120, the initial use case data set using a trained tractability ML model to generate a first determination whether the use case is ML tractable, wherein the trained tractability ML model is trained using historical tractability data. In an aspect ML model training module 142 may train the tractability ML model, and the training may use historical tractability data which may include one or more of a problem domain, problem data types, amount of available data, or whether the available data is labeled, and may be stored in database 126. ML operation module 144 of intelligent system 105 may load at runtime the tractability ML model. The method 1000 may include at block 1006 generating, based at least upon the first determination the use case is ML tractable, an onboarding ML model for solving the use case. In an aspect, ML model training module 142 may generate the onboarding ML model. At block 1008 the method 1000 may include receiving, by the one or more processors 120 from one or more of a user device or a third party device, a feedback data set. In an aspect of method 1000, the feedback data set may include one or more of a score, a directed question, or a benchmark. The method 1000 may further include processing, by the one or more processors 120, the initial use case data set and the feedback data set using the trained onboarding ML model.

In an aspect, method 1000 may further include receiving, by the user device from the one or more processors 120, the first determination whether the use case is ML tractable; receiving, by the one or more processors 120 from the user device and based at least upon one or more of the first determination the use case is ML tractable or receiving an instruction from the client device to override the first determination the use case is not ML tractable, a supplemental use case data set and processing, by the one or more processors 120, one or more the initial use case data set or the supplemental use case data set using a similarity ML model to generate a determination of a similar use case, wherein the similarity ML model is trained using historical use case data. The supplemental use case data may include one or more of data feature inputs, business impact gained by implementing a solution, business stakeholders, expected revenue, or risk if the use case is not implemented, and may be stored in database 126. The similarity ML model may be generated by ML model training module 142 of intelligent system 105. The historical use case data may include a project type, a project cost, or a project client identity and may be stored in database 126.

In an aspect, method 1000 may include providing, to the user device from the one or more processors 120 and based upon the determination by the one or more processors 120 that the similar use case exists, stakeholder data associated with the similar use case. In another aspect, method 1000 may include processing, by the one or more processors 120, one or more of a weighted initial use case data set or a weighted supplemental use case data set using a scoring ML model to generate a use case feasibility score, wherein the scoring ML model is trained on one or more of historical weighted initial use case data or historical weighted supplemental use case data, and may further include generating, by the one or more processors 120 and based at least upon a determination by the one or more processors 120 that the use case feasibility score reaches at least a predetermined threshold, a second determination that the use case is ML tractable, wherein onboarding the use case based at least upon the second determination the use case is ML tractable. In an aspect, the historical weighted initial use case data may include one or more of a problem domain, problem data types, amount of available data, or whether the available data is labeled and the historical weighted supplemental use case data may include one or more of data feature inputs, business impact gained by implementing a solution, business stakeholders, expected revenue, or risk if the use case is not implemented. In one example of method 1000, the use case feasibility score must meet an importance threshold of 60% for the second determination to result in the use case being ML tractable. Should the intelligent system 105 determine the use case is not ML tractable, the user may provide an instruction (e.g., to intelligent system 105 via client device 102) to override the second determination, which may include reviewing, by one or more domain expert analysts, the second determination the use case is not ML tractable and onboarding the use case by the one or more domain expert analysts.

Method 1000 may further include the one or more processors 120 determining whether one or more of classification, regression, time series model, clustering, or another type of ML algorithm is applicable to the use case, if the use case is determined to be ML tractable. If determining the use case is not ML tractable, the method 1000 may include providing to the user justification information for the determination. In an aspect of method 1000, the user may similarly provide an instruction to intelligent system 105 to override the first determination the use case is not ML tractable.

Generating the onboarding ML model of method 1000 may in include one or more of: an automated data access process; a risk and compliance process; a procuring infrastructure process; a dev ops process; a load testing process; a security pen testing process; generating a project execution plan; or an MVP process which may include generating, by the one or more processors 102 an MVP model; deploying the MVP model to a test environment; generating user credentials for the test environment; and providing the user credentials for the test environment to the user device.

Additional Considerations

With the foregoing, users whose data is being collected and/or utilized may first opt-in. After a user provides affirmative consent, data may be collected from the user's device (e.g., a mobile computing device). In other embodiments, deployment and use of neural network models at a client or user device may have the benefit of removing any concerns of privacy or anonymity, by removing the need to send any personal or private data to a remote server.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment", "in one aspect" or the like in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for the method and systems described herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method for improving an onboarding process of a use case received from a user device using machine learning by automatically evaluating a potential to implement machine learning on the use case and automating the onboarding process, the method comprising: receiving, by one or more processors, an initial use case data set from a user device; processing, by the one or more processors, the initial use case data set using a trained tractability machine learning model to generate a first determination whether the use case is ma-chine learning tractable, wherein the trained tractability machine learning model is trained using historical tractability data; generating, based at least upon the first determination the use case is machine learning tractable, an onboarding machine learning model for solving the use case; receiving, by the one or more processors from one or more of a user device or a third party device, a feedback data set; and processing, by the one or more processors, the initial use case data set and the feedback data set using the trained onboarding machine learning model.

2. The computer implemented method of aspect 1, wherein the initial use case data set includes at least one or more of a problem domain, problem data types, amount of available data, or whether the available data is labeled; the historical tractability data includes at least one or more of a problem domain, problem data types, amount of available data, or whether the available data is labeled; and the feedback data set includes one or more of a score, a directed question, or a benchmark.

3. The computer implemented method of aspects 1-2, further comprising: receiving, by the user device from the one or more processors, the first determination whether the use case is machine learning tractable; receiving, by the one or more processors from the user device and based at least upon one or more of the first determination the use case is machine learning tractable or receiving an instruction from the user device to override the first determination the use case is not machine learning tractable, a supplemental use case data set; and processing, by the one or more processors, one or more the initial use case data set or the supplemental use case data set using a similarity machine learning model to generate a determination of a similar use case, wherein the similarity machine learning model is trained using historical use case data.

4. The computer implemented method of aspect 3, wherein the historical use case data includes at least one or more of a project type, a project cost, or a project client identity; and the supplemental use case data set includes one or more of data feature inputs, business impact gained by implementing a solution, business stakeholders, expected revenue, or risk if the use case is not implemented.

5. The computer-implemented method of aspects 1-4, further comprising providing, to the user device from the one or more processors and based upon the determination by the one or more processors that the similar use case exists, stakeholder data associated with the similar use case; or processing, by the one or more processors, one or more of a weighted initial use case data set or a weighted supplemental use case data set using a scoring machine learning model to generate a use case feasibility score, wherein the scoring machine learning model is trained on one or more of historical weighted initial use case data or historical weighted supplemental use case data; and generating, by the one or more processors and based at least upon a determination by the one or more processors that the use case feasibility score reaches at least a predetermined threshold, a second determination that the use case is machine learning tractable, wherein onboarding the use case based at least upon the second determination the use case is machine learning tractable.

6. The computer implemented method of aspect 5 wherein the historical weighted initial use case data includes one or more of a problem domain, problem data types, amount of available data, or whether the available data is labeled; and the historical weighted supplemental use case data includes one or more of data feature inputs, business impact gained by implementing a solution, business stakeholders, expected revenue, or risk if the use case is not implemented.

7. The computer-implemented method of aspects 1-6, further comprising:
generating, by the one or more processors, the second determination that the use case is machine learning tractable when the use case feasibility score meets an importance threshold of 60%.

8. The computer-implemented method of aspects 1-6, further comprising:
receiving, by the user device from the one or more processors and based upon the determination the use case feasibility score does not reach the predetermined threshold, the second determination the use case is not machine learning tractable; receiving, by the one or more processors from the user device and based upon the second determination the use case is not machine learning tractable, an instruction to override the second determination the use case is not machine learning tractable; reviewing, by one or more domain expert analysts, the second determination the use case is not machine learning tractable; and onboarding, by the one or more domain expert analysts, the use case.

9. The computer-implemented method of aspects 1-8, further comprising:
receiving, by the user device from the one or more processors and based at least upon the first determination the use case is machine learning tractable, a determination whether one or more of classification, regression, time series model, clustering, or another type of machine learning algorithm is applicable to the use case; or receiving, by the user device from the one or more processors, justification information for the first determination the use case is not machine learning tractable; and receiving, by the one or more processors from the user device and based upon the first determination the use case is not machine learning tractable, an instruction to override the first determination the use case is not machine learning tractable.

10. The computer-implemented method of aspect 1, wherein generating the onboarding machine learning model includes one or more of: an automated data access process; a risk and compliance process; a procuring infrastructure process; a dev ops process;
a load testing process; a security pen testing process; generating a project execution plan; or an MVP process comprising: generating, by the one or more processors and based at least upon one or more of the initial use case data set or the supplemental use case data set, an MVP model; deploying, by the one or more processors, the MVP model to a test environment; generating, by the one or more processors, user credentials for the test environment; and providing, to the user device from the one or more processors, the user credentials for the test environment.

11. A computer system for improving an onboarding process of a use case received from a user device using machine learning by automatically evaluating a potential to implement machine learning on the use case and automating the onboarding process, comprising: one or more processors; and a memory comprising instructions, that when executed, cause the computer system to: receive an initial use case data set from a user device; process the initial use case data set using a trained tractability machine learning model to generate a first determination whether the use case is machine learning tractable, wherein the trained tractability machine learning model is trained using historical tractability data; generate an onboarding machine learning model for solving the use case based at least upon the first determination the use case is machine learning tractable; receive a feedback data set from one or more of a user device or a third party device; and process the initial use case data set and the feedback data set using the trained onboarding machine learning model.

12. The computer system of aspect 11, the initial use case data set includes at least one or more of a problem domain, problem data types, amount of available data, or whether the available data is labeled; the historical tractability data includes at least one or more of a project type, a project cost, a project client identity; and the feedback data set includes one or more of a score, a directed question, or a benchmark.

13. The computer system of aspect 11-12, the memory comprising further instructions that, when executed, cause the system to: provide to a user device the first determination whether the use case is machine learning tractable; receive a supplemental use case data set from the user device; process one or more of the initial use case data set or the supplemental use case data set using a similarity machine learning model to generate a determination of a similar use case, wherein the similarity machine learning model is trained using historical use case data.

14. The computer system of aspect 13, the historical use case data includes at least one or more of a project type, a project cost, or a project client identity; and the supplemental use case data set includes one or more of data feature inputs, business impact gained by implementing a solution, business stakeholders, expected revenue, or risk if the use case is not implemented.

15. The computer system of aspect 11-14, the memory comprising further instructions that, when executed, cause the system to: provide to the user device, stakeholder data associated with the similar use case; or process one or more of a weighted initial use case data set or a weighted supplemental use case data set using a scoring machine learning model to generate a use case feasibility score, wherein the scoring machine learning model is trained on one or more of historical weighted initial use case data or historical weighted supplemental use case data; generate a second determination that the use case is machine learning tractable based at least upon a determination the use case feasibility score reaches at least a predetermined threshold; and onboard the use case is based at least upon the second determination the use case is machine learning tractable.

16. The computer system of aspect 15 wherein: the historical weighted initial use case data includes one or more of a problem domain, problem data types, amount of available data, or whether the available data is labeled; and the historical weighted supplemental use case data includes one or more of data features, business impact gained by implementing a solution, business stakeholders, expected revenue, or risk if the use case is not implemented.

17. The computer system of aspect 11-16, the memory comprising further instructions that, when executed, cause the system to: provide the second determination that the use case is not machine learning tractable to a user device based upon the determination the use case feasibility score does not reach a predetermined threshold; receive an instruction from the user device to override the second determination the use case is not machine learning tractable; and onboard the use case by one or more domain expert analysts.

18. The computer system of aspect 11-17, the memory comprising further instructions that, when executed, cause the system to: provide to the user device a determination whether one or more of classification, regression, time series model, clustering, or another type of machine learning algorithm is applicable to the use case; or provide justification information to the user device for the first determination the use case is not machine learning tractable; and receive from the user device an instruction to override the first determination the use case is not machine learning tractable.

19. The computer system of aspect 11, wherein generate an onboarding machine learning model includes one or more of: an automated data access process; a risk and compliance process; a procuring infrastructure process; a dev ops process; a load testing process; a security pen testing process; generating a project execution plan; generating based at least upon one or more of the initial use case data set or the supplemental use case data set, an MVP model; deploying the MVP model to a test environment; generating user credentials for the test environment; or providing to the user device the user credentials for the test environment.

20. A non-transitory computer-readable storage medium storing executable instructions that, when executed by a processor, cause a computer to: receive an initial use case data set from a user device; process the initial use case data set using a trained tractability machine learning model to generate a first determination whether the use case is machine learning tractable, wherein the trained tractability machine learning model is trained using historical tractability data; generate an onboarding machine learning model for solving the use case based at least upon the first determination the use case is machine learning tractable; receive a feedback data set from one or more of a user device or a third party device; process the initial use case data set and the feedback data set using the trained onboarding machine learning model.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed:

1. A computer-implemented method for improving an onboarding process of a use case received from a user device using machine learning by automatically evaluating a potential to implement machine learning on the use case and automating the onboarding process, the computer-implemented method comprising:
   receiving, by one or more processors, an initial use case data set from a user device;
   processing, by the one or more processors, the initial use case data set using a trained tractability machine learning model to generate a first determination of whether the use case is machine learning tractable, wherein the trained tractability machine learning model is trained using historical tractability data from past use cases which were determined to be either machine learning tractable or not tractable;
   generating, by the one or more processors, an onboarding machine learning model for solving the use case based at least upon the first determination that the use case is machine learning tractable;
   receiving, by the one or more processors, a feedback data set related to the onboarding process of the use case from one or more of the user device or a third party device; and
   processing, by the one or more processors, the initial use case data set and the feedback data set using the generated onboarding machine learning model.

2. The computer-implemented method of claim 1, wherein:
   the initial use case data set includes at least one or more of a problem domain, problem data types, amount of available data, or whether the available data is labeled;
   the historical tractability data includes at least one or more of a problem domain, problem data types, amount of available data, or whether the available data is labeled; and
   the feedback data set includes one or more of a score, a directed question, or a benchmark.

3. The computer implemented computer-implemented method of claim 1, further comprising:
   receiving, by the user device from the one or more processors, the first determination of whether the use case is machine learning tractable;
   receiving, by the one or more processors from the user device, a supplemental use case data set based at least upon one or more of the first determination that the use case is machine learning tractable or receiving an instruction from the user device to override the first determination that the use case is not machine learning tractable; and
   processing, by the one or more processors, one or more of the initial use case data set or the supplemental use case data set using a similarity machine learning model to generate a determination of a similar use case, wherein the similarity machine learning model is trained using historical use case data.

4. The computer implemented method of claim 3, wherein:
   the historical use case data includes at least one or more of a project type, a project cost, or a project client identity; and
   the supplemental use case data set includes one or more of data feature inputs, business impact gained by implementing a solution, business stakeholders, expected revenue, or risk if the use case is not implemented.

5. The computer-implemented method of claim 3, further comprising:
   providing, to the user device from the one or more processors, stakeholder data associated with the similar use case based upon the determination that the similar use case exists;
   processing, by the one or more processors, one or more of a weighted initial use case data set or a weighted supplemental use case data set using a scoring machine learning model to generate a use case feasibility score, wherein the scoring machine learning model is trained on one or more of historical weighted initial use case data or historical weighted supplemental use case data; and
   generating, by the one or more processors, a second determination that the use case is machine learning tractable based at least upon a determination that the use case feasibility score reaches at least a predetermined threshold, wherein the onboarding process of the use case is based at least upon the second determination that the use case is machine learning tractable.

6. The computer implemented method of claim 5, wherein:
   the historical weighted initial use case data includes one or more of a problem domain, problem data types, amount of available data, or whether the available data is labeled; and
   the historical weighted supplemental use case data includes one or more of data feature inputs, business impact gained by implementing a solution, business stakeholders, expected revenue, or risk if the use case is not implemented.

7. The computer-implemented method of claim 5, further comprising:
generating, by the one or more processors, the second determination that the use case is machine learning tractable when the use case feasibility score meets an importance threshold of 60%.

8. The computer-implemented method of claim 5, further comprising:
receiving, by the user device from the one or more processors, the second determination that the use case is not machine learning tractable based upon the determination that the use case feasibility score does not reach the predetermined threshold;
receiving, by the one or more processors from the user device, an instruction to override the second determination that the use case is not machine learning tractable based upon the second determination that the use case is not machine learning tractable;
reviewing, by one or more domain expert analysts, the second determination that the use case is not machine learning tractable; and
onboarding, by the one or more domain expert analysts, the use case.

9. The computer-implemented method of claim 1, further comprising:
receiving, by the user device from the one or more processors, a determination of whether one or more of classification, regression, time series model, clustering, or another type of machine learning algorithm is applicable to the use case based at least upon the first determination that the use case is machine learning tractable;
receiving, by the user device from the one or more processors, justification information for the first determination that the use case is not machine learning tractable; and
receiving, by the one or more processors from the user device, an instruction to override the first determination that the use case is not machine learning tractable based upon the first determination that the use case is not machine learning tractable.

10. The computer-implemented method of claim 1, wherein generating the onboarding machine learning model for solving the use case includes one or more of:
an automated data access process;
a risk and compliance process;
a procuring infrastructure process;
a dev ops process;
a load testing process;
a security pen testing process;
generating a project execution plan; or
a minimum viable product (MVP) process comprising:
generating, by the one or more processors, an MVP model based at least upon one or more of the initial use case data set or a supplemental use case data set;
deploying, by the one or more processors, the MVP model to a test environment;
generating, by the one or more processors, user credentials for the test environment; and
providing, to the user device from the one or more processors, the user credentials for the test environment.

11. A computer system for improving an onboarding process of a use case received from a user device using machine learning by automatically evaluating a potential to implement machine learning on the use case and automating the onboarding process, comprising:
one or more processors; and
a memory storing instructions, that when executed by the one or more processors, cause the computer system to:
receive an initial use case data set from a user device;
process the initial use case data set using a trained tractability machine learning model to generate a first determination of whether the use case is machine learning tractable, wherein the trained tractability machine learning model is trained using historical tractability data from past use cases which were determined to be either machine learning tractable or not tractable;
generate an onboarding machine learning model for solving the use case based at least upon the first determination that the use case is machine learning tractable;
receive a feedback data set related to the onboarding process of the use case from one or more of the user device or a third party device; and
process the initial use case data set and the feedback data set using the generated onboarding machine learning model.

12. The computer system of claim 11, wherein:
the initial use case data set includes at least one or more of a problem domain, problem data types, amount of available data, or whether the available data is labeled;
the historical tractability data includes at least one or more of a project type, a project cost, or a project client identity; and
the feedback data set includes one or more of a score, a directed question, or a benchmark.

13. The computer system of claim 11, the memory storing further instructions that, when executed by the one or more processors, cause the computer system to:
provide to the user device the first determination of whether the use case is machine learning tractable;
receive a supplemental use case data set from the user device; and
process one or more of the initial use case data set or the supplemental use case data set using a similarity machine learning model to generate a determination of a similar use case, wherein the similarity machine learning model is trained using historical use case data.

14. The computer system of claim 13, wherein:
the historical use case data includes at least one or more of a project type, a project cost, or a project client identity; and
the supplemental use case data set includes one or more of data feature inputs, business impact gained by implementing a solution, business stakeholders, expected revenue, or risk if the use case is not implemented.

15. The computer system of claim 13, the memory storing further instructions that, when executed by the one or more processors, cause the computer system to:
provide to the user device, stakeholder data associated with the similar use case;
process one or more of a weighted initial use case data set or a weighted supplemental use case data set using a scoring machine learning model to generate a use case feasibility score, wherein the scoring machine learning model is trained on one or more of historical weighted initial use case data or historical weighted supplemental use case data;

generate a second determination that the use case is machine learning tractable based at least upon a determination that the use case feasibility score reaches at least a predetermined threshold; and onboard the use case is based at least upon the second determination that the use case is machine learning tractable.

16. The computer system of claim 15, wherein:

the historical weighted initial use case data includes one or more of a problem domain, problem data types, amount of available data, or whether the available data is labeled; and the historical weighted supplemental use case data includes one or more of data features, business impact gained by implementing a solution, business stakeholders, expected revenue, or risk if the use case is not implemented.

17. The computer system of claim 15, the memory storing further instructions that, when executed by the one or more processors, cause the computer system to:

provide the second determination that the use case is not machine learning tractable to the user device based upon the determination that the use case feasibility score does not reach a predetermined threshold;

receive an instruction from the user device to override the second determination that the use case is not machine learning tractable; and onboard the use case by one or more domain expert analysts.

18. The computer system of claim 11, the memory storing further instructions that, when executed by the one or more processors, cause the computer system to:

provide to the user device a determination of whether one or more of classification, regression, time series model, clustering, or another type of machine learning algorithm is applicable to the use case;

provide justification information to the user device for the first determination that the use case is not machine learning tractable; and receive from the user device an instruction to override the first determination that the use case is not machine learning tractable.

19. The computer system of claim 11, the memory storing further instructions that, when executed by the one or more processors, cause the computer system to generate the onboarding machine learning model for solving the use case including at least one or more of:

an automated data access process;

a risk and compliance process;

a procuring infrastructure process;

a dev ops process;

a load testing process;

a security pen testing process;

generating a project execution plan;

generating a minimum viable product (MVP) model based at least upon one or more of the initial use case data set or a supplemental use case data set;

deploying the MVP model to a test environment;

generating user credentials for the test environment; or providing to the user device the user credentials for the test environment.

20. A non-transitory computer-readable medium storing executable instructions that, when executed by a processor, cause a computer to:

receive an initial use case data set from a user device;

process the initial use case data set using a trained tractability machine learning model to generate a first determination of whether the use case is machine learning tractable, wherein the trained tractability machine learning model is trained using historical tractability data from past use cases which were determined to be either machine learning tractable or not tractable;

generate an onboarding machine learning model for solving the use case based at least upon the first determination that the use case is machine learning tractable;

receive a feedback data set related to an onboarding process of the use case from one or more of the user device or a third party device; and process the initial use case data set and the feedback data set using the generated onboarding machine learning mode.

* * * * *

UNITED STATES PATENT AND TRADEMARK OFFICE
CERTIFICATE OF CORRECTION

PATENT NO. : 11,755,289 B1
APPLICATION NO. : 18/113548
DATED : September 12, 2023
INVENTOR(S) : Rares Almasan et al.

It is certified that error appears in the above-identified patent and that said Letters Patent is hereby corrected as shown below:

In the Claims

Claim 3, at Column 26, Line 10, "computer implemented computer-implemented" should be --computer-implemented--.

Claim 4, at Column 26, Line 29, "computer implemented" should be --computer-implemented--.

Claim 6, at Column 26, Line 60, "computer implemented" should be --computer-implemented--.

Claim 20, at Column 30, Line 40, "mode." should be --model.--.

Signed and Sealed this
Twenty-third Day of April, 2024

*Katherine Kelly Vidal*
Katherine Kelly Vidal
*Director of the United States Patent and Trademark Office*